United States Patent Office 3,318,962
Patented May 9, 1967

---

3,318,962
BIS[2-HYDROXY-3-(ALPHA,ALPHA-DIMETHYL-
BENZYL)-5-METHYLPHENYL]METHANE
Francis X. O'Shea, Wolcott, Conn., assignor to United
States Rubber Company, New York, N.Y., a corporation of New Jersey
No Drawing. Filed Oct. 10, 1963, Ser. No. 315,404
1 Claim. (Cl. 260—619)

This invention relates to a new chemical which possesses superior activity as a stabilizer for polypropylene and lubricating oils.

The chemical of the present invention is bis[2-hydroxy-3-(alpha, alpha-dimethylbenzyl)-5-methylphenyl]methane.

The chemical of the invention is prepared by reacting p-cresol with alpha-methylstyrene in approximately equimolar ratios to form the intermediate 2-(alpha, alpha-dimethylbenzyl)-p-cresol. The intermediate 2-(alpha, alpha-dimethylbenzyl)-p-cresol is reacted with approximately one-half mole of formaldehyde per mol of the intermediate to produce the bis[2-hydroxy-3-(alpha, alpha-dimethylbenzyl)-5-methylphenyl]methane having the formula:

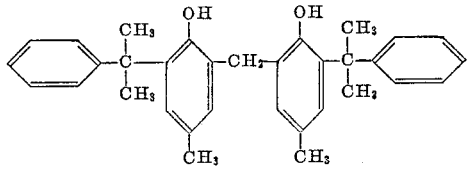

The p-cresol is reacted with the alpha-methylstyrene in the presence of a Friedel-Crafts catalyst such as sulfuric acid, phosphoric acid, boron trifluoride, boron trifluoride etherate (boron trifluoride-diethyl ether complex), aluminum chloride, zinc chloride, etc. The resulting 2-(alpha, alpha-dimethylbenzyl)-p-cresol is reacted with the formaldehyde in an acid medium, as in the presence of butylphosphoric acid (mixture of the mono- and di-butyl esters of phosphoric acid), sulfuric acid, p-toluene sulfonic acid, etc., with or without a solvent such as benzene, toluene, xylene, ethylene dichloride, hexane, etc. as at the reflux temperature of the solvent, or at temperatures from 100° C. to 125° C. without a solvent. The intermediate 2-(alpha, alpha-dimethylbenzyl)-p-cresol which is reacted with the formaldehyde may be in the form of the crude reaction product of the p-cresol and alpha-methyl styrene, or the compound may be recovered from the crude reaction product as by distillation before reaction with the formaldehyde.

The following examples illustrate the invention. All parts and percentages referred to herein are by weight.

Example 1

The 2-(alpha, alpha-dimethylbenzyl)-p-cresol was prepared as follows:

To a mixture of 1,080 g. (10 moles) of p-cresol and 54 g. of BF₃-etherate (boron trifluoride-diethyl ether complex) was added 1,180 g. (10 moles) of alpha-methylstyrene at a rate sufficient to maintain the reaction temperature at about 50° C. After addition was complete and the exotherm had subsided, the mixture was stirred for another two hours while heating at 50° C. Anhydrous ammonia was then bubbled through and the BF₃–NH₃ complex which precipitated was filtered off. The filtrate was then distilled to remove starting materials until the boiling point of the distillate reached 180° C. at 10 mm. The residue, weighing 1,227 g. was then distilled through a Vigreux column. 2-(alpha, alpha-dimethylbenzyl)-p-cresol was collected as a liquid fraction, B.P. 147–151° C. at 1 mm., wt. 806 g.

The bis[2-hydroxy-3-(alpha, alpha-dimethylbenzyl)-5-methylphenyl]methane was prepared as follows:

A mixture of 226 g. (1 mole) of the above prepared 2-(alpha, alpha-dimethylbenzyl)-p-cresol, 15.8 g. (0.5 mole) of paraformaldehyde, 4.5 g. of butylphosphoric acid and 100 ml. of benzene was heated under reflux at about 80° C. for 20 hours in a one-liter 3-neck flask equipped with a thermometer, mechanical stirrer, Stark and Dean trap and condenser. The water formed during the reaction and collected in the Stark and Dean trap amounted to 5 ml. (theory=9 ml.). The benzene was then removed under reduced pressure and 3 g. of propylene oxide was added to deactivate the catalyst. The extremely viscous product weighed 231 g.

A portion of the bis[2-hydroxy-3-(alpha, alpha-dimethylbenzyl)-5-methylphenyl]methane product was crystallized from ethanol yielding a white solid, M.P. 141–143° C. A sample recrystallized from ethanol and twice more from hexane gave the following analysis. Calculated: C, 85.30%; H, 7.81%. Found: C, 84.67%; H, 7.89%.

Example 2

This example illustrates the effectiveness as a stabilizer combination for solid polypropylene of bis[2-hydroxy-3-(alpha, alpha-dimethylbenzyl)-5-methylphenyl]methane and a dialkyl ester of beta-thiodipropionic acid in which the alkyl radicals have 10 to 18 carbon atoms, e.g. didecyl, dilauryl, ditridecyl, or distearyl beta-thiodipropionate, the preferred embodiment being dilauryl beta-thiodipropionate. In stabilizing the polypropylene, 0.1% to 2% (preferably 0.25% to 0.5%) by weight of the polypropylene of each of the above compounds forming the stabilizer combination are intimately mixed with the solid polypropylene. The stabilizer combination can be incorporated in the solid polypropylene compositions by conventional methods used for mixing such materials into resins or plastics. They can be incorporated separately or together in the polypropylene by dry blending with the polypropylene powder, or by milling into the polypropylene on heated rolls, or by dissolving in a solvent and dispersing in the polypropylene powder and evaporating off the solvent.

To illustrate the effectiveness of the stabilizer combination, dilauryl beta-thiodipropionate and bis[2-hydroxy-3-(alpha, alpha-dimethylbenzyl)-5-methylphenyl] methane, separately and together, were dry mixed with unstabilized polypropylene powder in a conventional mixer. The polypropylene was a general purpose grade solid polypropylene having an average molecular weight of approximately 200,000, a density of about .905, and a crystalline melting point of 333° F. The thus compounded polypropylene and uncompounded polypropylene powder was then banded on a two-roll differential mill, commonly used in the rubber and plastics industry. A roll temperature of about 340° F. was used. After banding, it was cross cut and end-rolled to assure complete dispersion of the added stabilizer components and combinations in the polypropylene. The material was then sheeted off at about 75–100 mils (0.075–0.1 inch) thickness. The milled polypropylene was then molded into 6-inch by 6-inch by about 75 mil thickness slabs in a hydraulic press in which steam was used to heat the platens to about 350° F. The slabs of polypropylene were preheated at contact pressure for two minutes and then pressed for two minutes at full pressure. The press was then cooled to about 100° F. before the pressure was released.

The stability of the various molded pieces of polypropylene was tested by placing sections of the 75-mil thick moldings in a circulating air oven which was maintained at about 149° C. (300° F.). The samples were observed frequently until they showed the first signs of crumbling or degradation. This test is dependent upon the thickness of the sample and the temperature, thinner samples degrading sooner at the same temperature. The degradation of the polypropylene samples was readily evident in crazing on the surface or discolored crumbling of the edges, the first sign of which was considered the break point.

The times at which degradation was observed for the various tests are shown in the following table in which percents are by weight based on the weight of the polypropylene

| | Days |
|---|---|
| Polypropylene (uncompounded) | <3 |
| Polypropylene containing 0.3% of dilauryl beta-thiodipropionate | 12 |
| Polypropylene containing 0.3% of bis[2-hydroxy-3-(alpha, alpha - dimethylbenzyl)-5-methylphenyl]methane | 2–3 |
| Polypropylene containing 0.3% of dilauryl beta-thiodipropionate and 0.3% of bis[2-hydroxy-3-(alpha, alpha-dimethylbenzyl)-5-methylphenyl]methane | 60 |

Example 3

This example demonstrates the usefulness of the compound of the invention as a stabilizer for lubricating oils. The compound may be incorporated in a concentration range of 0.1% to 2%, preferably 0.2% to 0.5%, based on the weight of the lubricating oil.

The bis[2-hydroxy-3-(alpha, alpha-dimethylbenzyl)-5-methylphenyl]methane was evaluated in a concentration of 0.3% by weight of a petroleum based lubricating oil using ASTM–D–943 oxidation test for turbine oils. In the test, a mixture of 300 ml. of the oil and 60 ml. of distilled water is heated at 95° C. under a water cooled condenser. Copper and iron coils are submerged in the system and oxygen is bubbled through at the rate of three liters per hour. The break point is the amount of time required for the acidity of the mixture to rise to an acid number of 2 or for heavy sludge to develop with a corresponding large increase in viscosity.

The results showed less than 7 days to the break point for the oil alone, and 106 days to the break point for the oil containing the bis[2-hydroxy-3-(alpha, alpha-dimethylbenzyl)-5-methylbenzyl]methane.

In view of the many changes and modifications that may be made without departing from the principles underlying the invention, reference should be made to the appended claim for an understanding of the scope of the protection afforded the invention.

Having thus described my invention, what I claim and desire to protect by Letters Patent is:

Bis[2 - hydroxy - 3-(alpha, alpha-dimethylbenzyl)-5-methylphenyl]methane.

References Cited by the Examiner
UNITED STATES PATENTS

| | | | |
|---|---|---|---|
| 2,315,556 | 4/1943 | Soday | 260—619 |
| 2,321,440 | 6/1943 | Ward | 260—619 |
| 2,593,411 | 4/1952 | Caldwell | 260—47 |
| 2,636,859 | 4/1953 | Entwistle et al. | 252—42.4 |
| 2,731,443 | 1/1956 | Forman | 260—45.95 |
| 3,003,981 | 10/1961 | Wear | 260—47 |
| 3,024,285 | 3/1962 | Bruin et al. | 260—47 |
| 3,057,928 | 10/1962 | Koblitz et al. | 260—619 |
| 3,073,868 | 1/1963 | Prahl et al. | 260—619 |
| 3,091,645 | 5/1963 | Rocklin | 260—619 |
| 3,092,610 | 6/1963 | Schwarzer | 260—47 |
| 3,132,102 | 5/1964 | Coffield | 252—42.4 |

LEON ZITVER, *Primary Examiner.*

BERNARD HELFIN, DANIEL E. WYMAN,
*Examiners.*

D. M. HELFER, I. VAUGHN, *Assistant Examiners.*